(12) United States Patent
Ishigaki et al.

(10) Patent No.: US 11,247,513 B2
(45) Date of Patent: Feb. 15, 2022

(54) TYRE

(71) Applicant: SUMITOMO RUBBER INDUSTRIES, LTD., Hyogo (JP)

(72) Inventors: Yuichi Ishigaki, Hyogo (JP); Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 376 days.

(21) Appl. No.: 16/241,567

(22) Filed: Jan. 7, 2019

(65) Prior Publication Data
US 2019/0225028 A1 Jul. 25, 2019

(30) Foreign Application Priority Data
Jan. 23, 2018 (JP) .............................. JP2018-008980

(51) Int. Cl.
*B60C 11/13* (2006.01)
*B60C 11/04* (2006.01)
*B60C 11/03* (2006.01)

(52) U.S. Cl.
CPC ........ *B60C 11/1353* (2013.01); *B60C 11/045* (2013.01); *B60C 11/047* (2013.01); *B60C 11/1315* (2013.01); *B60C 2011/0346* (2013.01); *B60C 2011/0374* (2013.01); *B60C 2011/1338* (2013.01); *B60C 2011/1361* (2013.01)

(58) Field of Classification Search
CPC ......... B60C 11/1353; B60C 2011/1361; B60C 2011/133; B60C 2011/1338; B60C 11/045; B60C 11/047; B60C 11/13; B60C 11/1307; B60C 11/1315; B60C 11/1323
See application file for complete search history.

(56) References Cited

U.S. PATENT DOCUMENTS

| 6,415,835 B1 * | 7/2002 | Heinen | ............... B60C 11/0309 |
| | | | 152/209.21 |
| 2013/0333818 A1 * | 12/2013 | Yamaguchi | ........... B60C 11/042 |
| | | | 152/523 |

FOREIGN PATENT DOCUMENTS

JP 2016-137763 A 8/2016

* cited by examiner

*Primary Examiner* — Alison L Hindenlang
*Assistant Examiner* — George W. Brady
(74) *Attorney, Agent, or Firm* — Greenblum & Bernstein, P.L.C.

(57) ABSTRACT

A groove bottom is formed symmetrically about a center line of a circumferential groove in a tread plan view and includes groove bottom protruding portions protruding radially outwardly from a groove bottom reference surface parallel to a tread surface at a deepest position of a groove depth. Groove bottom protruding portions have a first groove bottom surface extending radially and a second groove bottom surface having an angle larger than the first groove bottom surface. Groove walls include groove wall protruding portions protruding toward an inner side of the circumferential groove from a groove wall reference surface as a circumferential surface at a widest position of a groove width. The groove wall protruding portions each has a first groove wall width surface and a second groove wall width surface having an angle larger than the first groove wall width surface.

18 Claims, 4 Drawing Sheets

TYRE

TECHNICAL FIELD

The present invention relates to a tyre having a tread portion provided with a circumferential groove extending continuously in a tyre circumferential direction.

BACKGROUND ART conventionally, in order to improve on-snow performance, an attempt has been made to specify the shape of groove walls of the circumferential groove extending continuously in the tyre circumferential direction formed in the tread portion. For example, Japanese unexamined Patent Application Publication No. 2016-137763 (Patent Literature 1) has proposed a tyre having improved on-snow performance by providing enlarged width portions in the circumferential grooves.

SUMMARY OF THE INVENTION

However, there has been a case with the tyre disclosed in Patent Literature 1 where drive power and braking force become insufficient during running on a snowy road surface depending on the use situation, therefore, there has been a demand for further improvement to maintain the on-snow performance high.

The present invention was made in view of the above, and a primary object thereof is to provide a tyre capable of improving the on-snow performance by specifying the shape of the circumferential groove.

In one aspect of the present invention, a tyre comprises a tread portion including a tread surface which is to be in contact with a ground during running, wherein the tread portion is provided with a circumferential groove extending continuously in a tyre circumferential direction, the circumferential groove has a groove bottom and a pair of groove walls extending from the groove bottom to the tread surface in a tyre radial direction, the groove bottom is formed symmetrically with respect to a center line of the circumferential groove in a plan view of the tread portion and includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions has a first groove bottom surface extending in the tyre radial direction and a second groove bottom surface having an angle larger than that of the first groove bottom surface with respect to the tyre radial direction, each of the groove walls includes a plurality of groove wall protruding portions each protruding toward an inner side of the circumferential groove from a groove wall reference surface defined as a surface along the tyre circumferential direction at a widest position of a groove width of the circumferential groove, and each of the groove wall protruding portions has a first groove wall surface extending in a tyre width direction and a second groove wall surface having an angle with respect to the tyre width direction larger than that of the first groove wall surface.

In another aspect of the invention, it is preferred that the groove bottom protruding portions are formed over an entire width in the tyre width direction of the circumferential groove.

In another aspect of the invention, it is preferred that the first groove bottom surface is formed by a flat surface extending in the tyre width direction.

In another aspect of the invention, it is preferred that a height in the tyre radial direction of the first groove bottom surface is not less than 0.5 mm.

In another aspect of the invention, it is preferred that the pair of the groove walls is formed symmetrically with respect to the center line of the circumferential groove in the plan view of the tread portion.

In another aspect of the invention, it is preferred that the second groove wall surface is formed by a curved surface.

In another aspect of the invention, it is preferred that the second groove wall surface is formed by a flat surface.

In another aspect of the invention, it is preferred that an interval between the first groove bottom surfaces adjacent to each other in the tyre circumferential direction is in a range of from 10 to 15 mm.

In another aspect of the invention, it is preferred that an interval between the first groove wall surfaces adjacent to each other in the tyre circumferential direction is equal to the interval between the first groove bottom surfaces adjacent to each other in the tyre circumferential direction.

DESCRIPTION OF THE PREFERRED EMBODIMENT

An embodiment of the present invention will now be described below in detail in conjunction with accompanying drawings.

Figure 1:
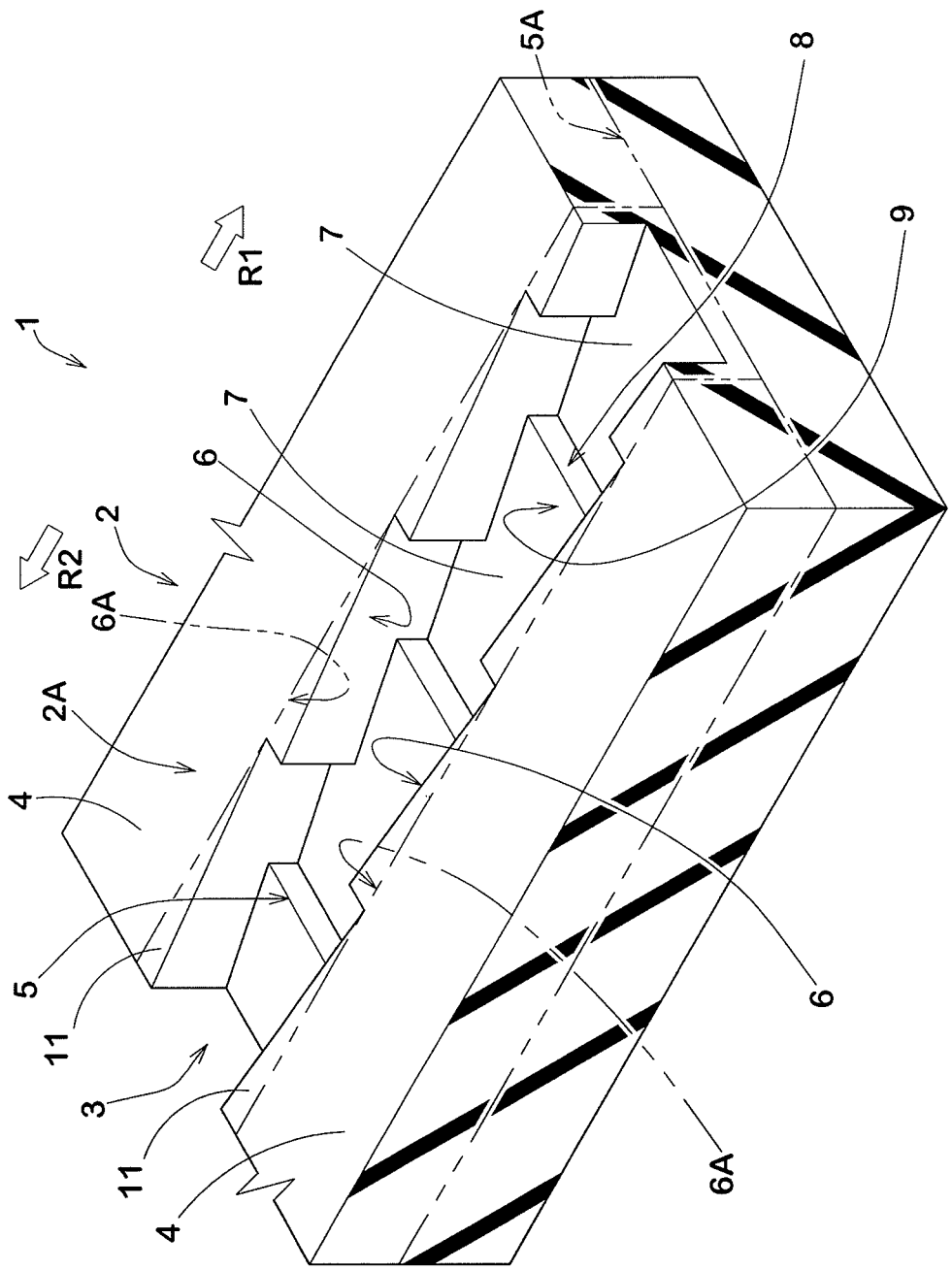
FIG. 1 is a perspective view of a circumferential groove of a tyre according to an embodiment of the present invention.

FIG. 1 is a perspective view of a circumferential groove 3 of a tyre 1 in this embodiment. As shown in FIG. 1, the tyre 1 in this embodiment has a tread portion 2 including a tread surface (2A) which is to be in contact with a road surface during running. The tyre 1 in this embodiment is suitably used as a winter tyre. Here, the winter tyre means a tyre suitable for running on a snowy road surface including a studless tyre, a snow tyre, and an all season tyre.

The tread portion 2 in this embodiment includes at least one circumferential groove 3 extending continuously in the tyre circumferential direction and a plurality of land regions 4 divided by the circumferential groove 3.

Figure 2:
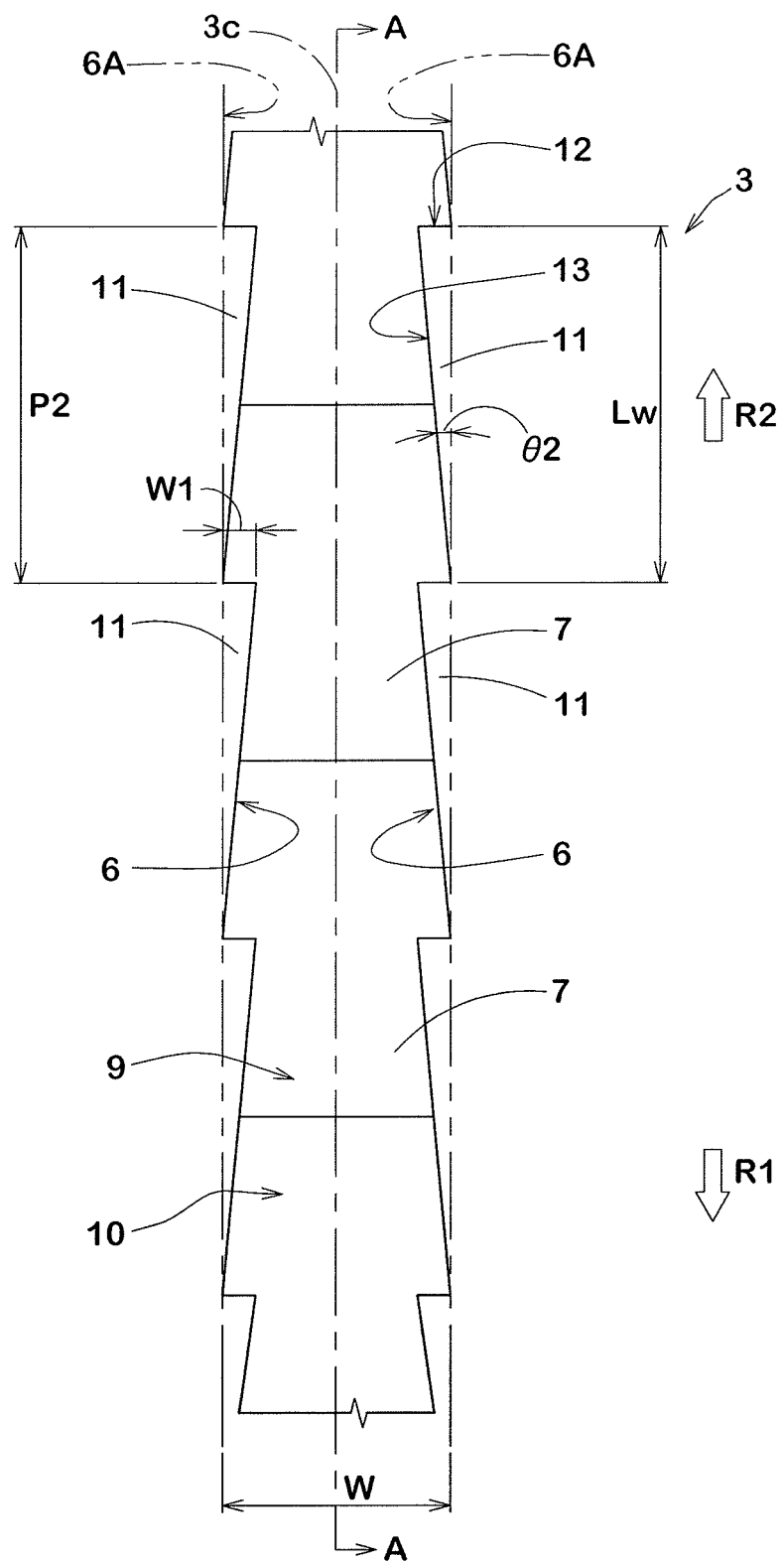
FIG. 2 is a plan view of the circumferential groove of FIG. 1.
Figure 3:
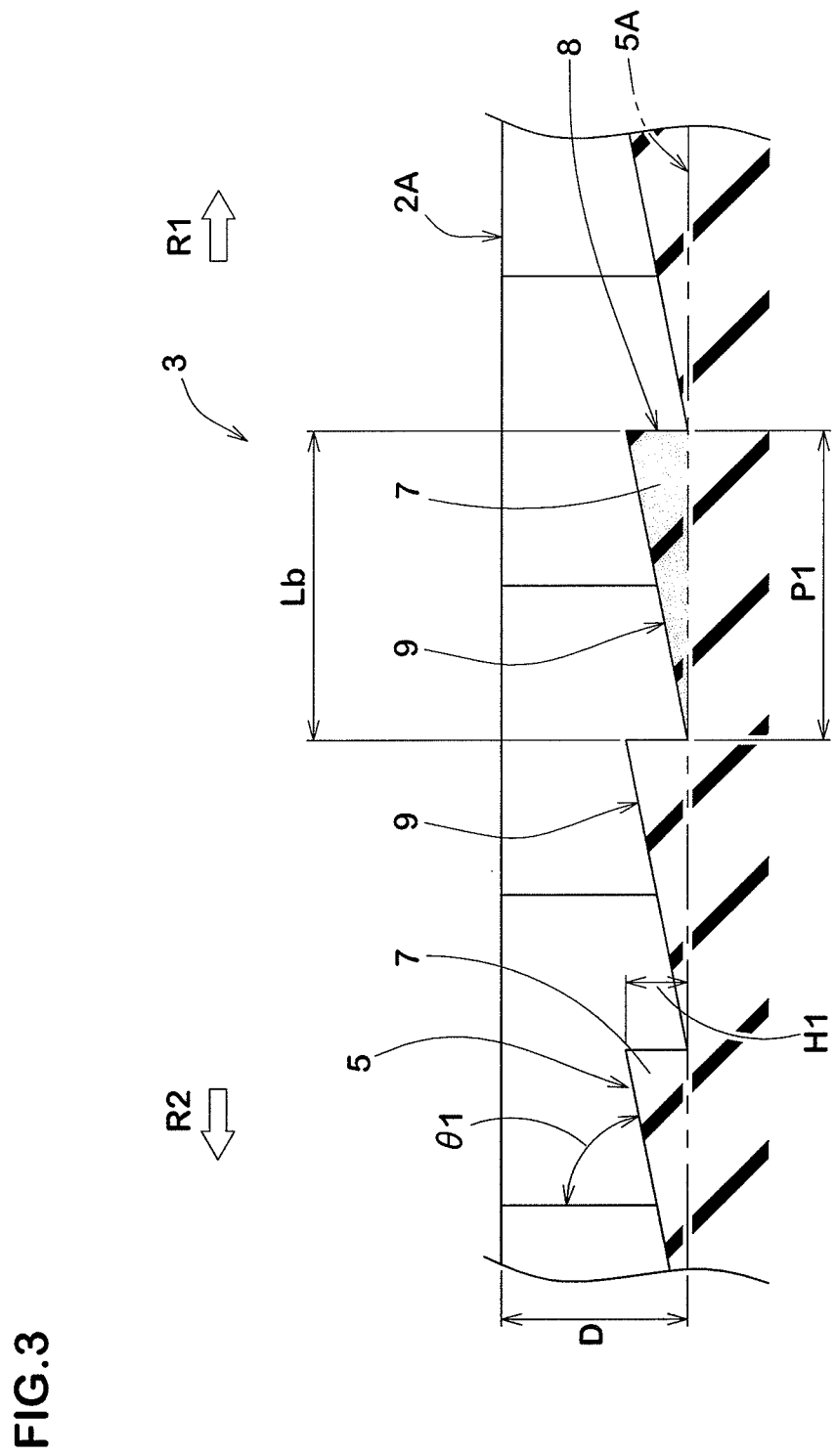
FIG. 3 is a cross-sectional view taken along A-A line of FIG. 2.

FIG. 2 is a plan view of the circumferential groove 3, and FIG. 3 is a cross-sectional view taken along A-A line of FIG. 2. As shown in FIGS. 1 to 3, the circumferential groove 3 in this embodiment has a groove bottom 5 and a pair of groove walls 6 each extending from the groove bottom 5 toward the tread surface (2A) in a tyre radial direction. Here, in this specification, "extending in a direction" means containing a lot of components in that direction.

As shown in FIG. 2, the groove bottom 5 in this embodiment is formed to be symmetrical with respect to a center line (3c) of the circumferential groove 3 in a plan view of the tread portion.

As shown in FIGS. 1 and 3, the groove bottom 5 includes a plurality of groove bottom protruding portions 7 each protruding outwardly in the tyre radial direction from a groove bottom reference surface (5A) defined as a surface parallel to the tread surface (2A) at a deepest position of a groove depth (D) of the circumferential groove 3. In FIG. 3, for ease of understanding, one of the groove bottom protruding portions 7 is shaded.

In the circumferential groove 3 configured as such, the groove bottom protruding portions 7 stick themselves into snow even when the tyre 1 is worn, therefore, it is possible that excellent on-snow performance is maintained. Further, the groove bottom protruding portions 7 configured as such disturb vibration in an air column of the circumferential groove 3, therefore, it is possible that air column resonance sound during running is decreased, thereby, it is possible that noise performance of the tyre 1 is improved.

Each of the groove bottom protruding portions 7 in this embodiment has a first groove bottom surface 8 extending in the tyre radial direction and a second groove bottom surface 9 having an angle larger than that of the first groove bottom surface 8 with respect to the tyre radial direction. In the groove bottom protruding portions 7 configured as such, edge components in a tyre width direction are increased by the first groove bottom surfaces 8, therefore, it is possible that the drive power and the braking force during running on a snowy road surface are improved. Further, when the tyre 1 rotates in a second rotational direction (R2), snow moves along the second groove bottom surfaces 9, therefore, condensation of the snow is promoted, thereby, it is possible that snow shearing force is improved even when the tyre 1 is in a worn state.

As shown in FIGS. 1 and 2, each of the groove walls 6 in this embodiment includes a plurality of groove wall protruding portions 11 each protruding toward an inner side, that is toward the center, of the circumferential groove 3 from a groove wall reference surface (6A) defined as a surface along the tyre circumferential direction at the widest position of a groove width (w) of the circumferential groove 3. In FIG. 2, for ease of understanding, one of the groove wall protruding portions 11 is shaded. Here, in this specification, "along a direction" means "parallel to the direction".

In the circumferential groove 3 configured as such, the groove wall protruding portions 11 stick themselves into the snow, therefore, it is possible that the on-snow performance is improved. Further, the groove wall protruding portions 11 configured as such disturb the vibration in the air column of the circumferential groove 3, therefore, it is possible that the air column resonance sound during running is decreased, thereby, it is possible that the noise performance of the tyre 1 is improved.

Each of the groove wall protruding portions 11 has a first groove wall surface 12 extending in the tyre width direction and a second groove wall surface 13 having an angle with respect to the tyre width direction larger than that of the first groove wall surface 12. In the groove walls 6 configured as such, the edge components in the tyre width direction are increased by the first groove wall surfaces 12, therefore, it is possible that the drive power and the braking force during running on a snowy road surface are improved. Further, when the tyre 1 is rotated in a first rotational direction (R1) in which an opening side of the groove wall protruding portions 11 is a heel side, the snow moves along the second groove wall surfaces 13, therefore, the condensation of the snow is promoted, thereby, it is possible that the snow shearing force is improved. The opening side is a wider side in the tyre width direction between the groove wall protruding portions 11. Thereby, in the tyre 1 in this embodiment, the groove bottom protruding portions 7 stick themselves into the snow condensed by the groove walls 6, therefore, it is possible that the on-snow performance is further improved. Furthermore, in the circumferential groove 3 configured as such, a snow discharging effect is improved due to deformation of the groove bottom protruding portions 7 and the groove wall protruding portions 11 at the time of the tread surface (2A) contacting the ground and leaving the ground, therefore, it is possible that the on-snow performance is further improved.

It is possible that the tyre 1 having the circumferential groove 3 described above maintains good on-snow performance by specifying the shapes of the groove bottom 5 and the groove walls 6 regardless of whether the tyre 1 is worn or not worn. More preferred shapes of the groove bottoms 5 and the groove walls 6 will be described below.

As shown in FIG. 2, it is preferred that the groove bottom protruding portions 7 are formed over the entire width in the tyre width direction of the circumferential groove 3. Further, it is preferred that teach of the first groove bottom surfaces 8 is orthogonal to the center line (3c) of the circumferential groove 3. Note that, in the circumferential groove 3, the center line (3c) in a groove width direction thereof extends along the tyre circumferential direction, for example.

As shown in FIG. 3, it is preferred that a height (H1) in the tyre radial direction of each of the first groove bottom surfaces 8 is not less than 0.5 mm. It is preferred that the height (H1) of each of the first groove bottom surfaces 8 is smaller than a height, from the groove bottom reference surface (5A), of a tread wear indicator (not shown) indicating a wear limit of the tyre 1. In the groove bottom protruding portions 7 having the first groove bottom surfaces 8 configured as such, the first groove bottom surfaces 8 certainly stick themselves into the snow even when the tyre 1 is used up to the wear limit, therefore, it is possible that good on-snow performance is maintained.

It is preferred that an interval (P1) between the first groove bottom surfaces 8 adjacent to each other in the tyre circumferential direction is in the range of from 10 to 15 mm. In the groove bottom protruding portions 7 having the first groove bottom surfaces 8 configured as such, the first groove bottom surfaces 8 appropriately stick themselves into the snow, therefore, it is possible that the on-snow performance is improved.

It is preferred that each of the second groove bottom surfaces 9 has an angle $\theta1$ in the range of from 70 to 87 degrees with respect to the tyre radial direction. With the second groove bottom surfaces 9 configured as such, when the tyre 1 is rotated in the second rotational direction (R2), snow moves along the second groove bottom surfaces 9, therefore, condensation of the snow is promoted, thereby, it is possible that the snow shearing force is improved.

A length (Lb) in the tyre circumferential direction of each of the groove bottom protruding portions 7 in this embodiment is substantially equal to the interval (P1) between the first groove bottom surfaces 8 adjacent to each other in the tyre circumferential direction. Note that the length (Lb) of each of the groove bottom protruding portions 7 may be smaller than the interval (P1) between the first groove bottom surfaces 8 adjacent to each other in the tyre circumferential direction.

As shown in FIG. 2, it is preferred that the pair of the groove walls 6 is formed symmetrically with respect to the center line (3c) of the circumferential groove 3 in the plan view of the tread portion. That is, each of the groove wall protruding portions 11 formed in one of the groove walls 6 is located at the same position in the tyre circumferential direction as a respective one of the groove wall protruding portions 11 formed in the other one of the groove walls 6. Each of the first groove wall surfaces 12 and the second groove wall surfaces 13 in this embodiment is formed by a flat surface. In the groove walls 6 configured as such, the condensation of snow is further promoted by the second groove wall surfaces 13, therefore, it is possible that the snow shearing force is further improved.

It is preferred that a length W1 in the tyre width direction of each of the first groove wall surfaces 12 is not less than 1 mm. If the length W1 of each of the first groove wall surfaces 12 is less than 1 mm, it is possible that the snow condensation effect by the second groove wall surfaces 13 is decreased.

It is preferred that the length W1 in the tyre width direction of each of the first groove wall surfaces 12 is not more than 20% of an interval (P2) between the first groove wall surfaces 12 adjacent to each other in the tyre circumferential direction. It is preferred that the interval (P2) between the first groove wall surfaces 12 adjacent to each other in the tyre circumferential direction is equal to the interval (P1) between the first groove bottom surfaces 8 adjacent to each other in the tyre circumferential direction. With the circumferential groove 3 configured as such, it is possible that the snow discharging effect by the deformation of the groove bottom protruding portions 7 and the groove wall protruding portions 11 at the time of the tread surface (2A) contacting the ground and leaving the ground is further improved.

A length (Lw) in the tyre circumferential direction of each of the groove wall protruding portions 11 in this embodiment is substantially equal to the interval (P2) between the first groove wall surfaces 12 adjacent to each other in the tyre circumferential direction. Thereby, it is preferred that the length W1 in the tyre width direction of each of the first groove wall surfaces 12 is not more than 20% of the length (Lw) in the tyre circumferential direction of each of the groove wall protruding portions 11. It is possible that the groove wall protruding portions 11 having the first groove wall surfaces 12 configured as such stick themselves into snow at appropriate pitches, therefore, it is possible that the on-snow performance is stably exerted.

It is preferred that each of the second groove wall surfaces 13 has an angle θ2 in the range of from 3 to 20 degrees with respect to the tyre circumferential direction in the plan view of the tread portion. The second groove wall surfaces 13 configured as such promote the condensation of snow, therefore, it is possible that the snow shearing force is improved.

Figure 4A:
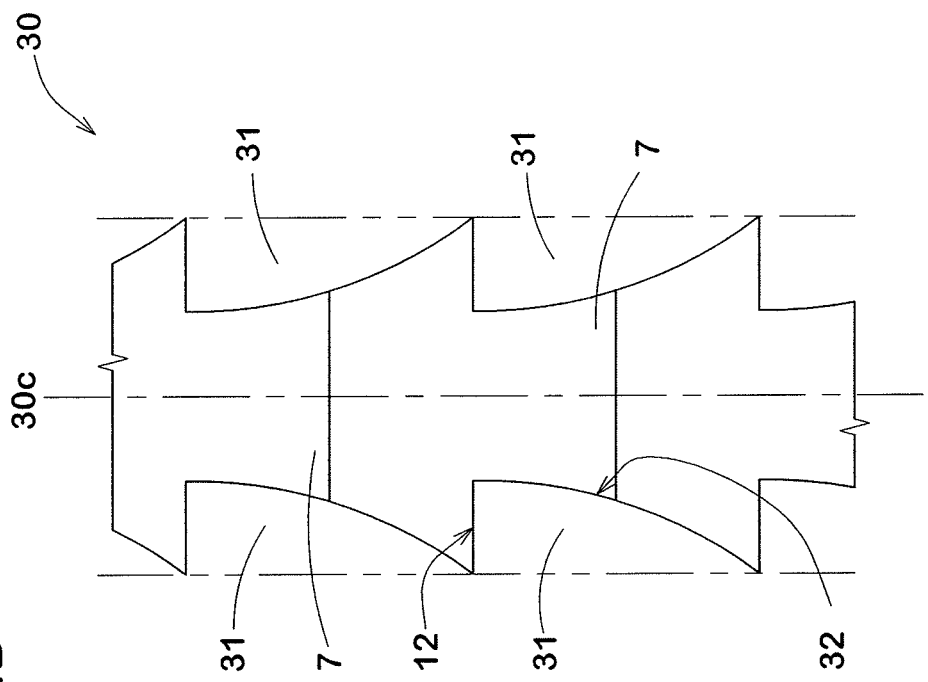
FIG. 4A is a plan view of the circumferential groove according to another embodiment of the present invention.
Figure 4B:
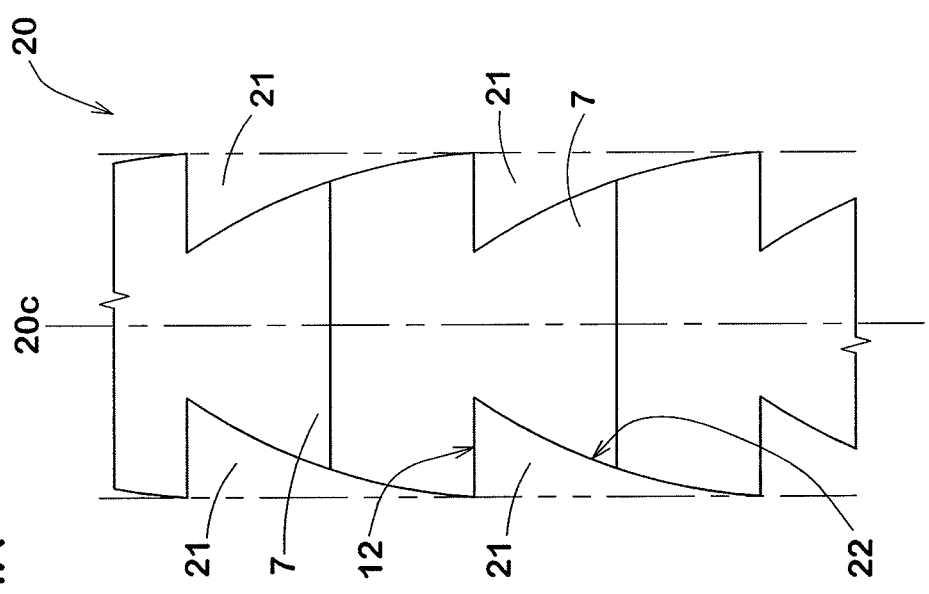
FIG. 4B is a plan view of the circumferential groove according to yet another embodiment of the present invention.

FIGS. 4A and 4B are plan views of circumferential grooves 20 and 30, respectively, according to other embodiments. The same reference numerals are given to the elements common to the embodiment described above, and the explanations thereof are omitted.

FIG. 4A shows the circumferential groove 20 in which each of second groove wall surfaces 22 of groove wall protruding portions 21 is formed by a curved surface. As shown in FIG. 4A, the circumferential groove 20 in this embodiment includes a plurality of the groove bottom protruding portions 7 and a plurality of the groove wall protruding portions 21. Each of the groove wall protruding portions 21 in this embodiment has one of the first groove wall surfaces 12 extending in the tyre width direction and its adjacent one of the second groove wall surfaces 22 having an angle with respect to the tyre width direction larger than that of the first groove wall surface 12.

Each of the second groove wall surfaces 22 in this embodiment is formed by a curved surface concave toward the outer side in the tyre width direction of the circumferential groove 20. With the groove wall protruding portions 21 configured as such, it is possible that the snow is condensed along the curved surfaces of the second groove wall surfaces 22, therefore, it is possible that the snow shearing force is improved.

FIG. 4B shows the circumferential groove 30 in which each of second groove wall surfaces 32 of groove wall protruding portions 31 is formed by a curved surface. As shown in FIG. 4B, the circumferential groove 30 in this embodiment includes a plurality of the groove bottom protruding portions 7 and a plurality of the groove wall protruding portions 31. Each of the groove wall protruding portions 31 in this embodiment has one of the first groove wall surfaces 12 extending in the tyre width direction and its adjacent one of the second groove wall surfaces 32 having an angle with respect to the tyre width direction larger than that of the first groove wall surface 12.

Each of the second groove wall surfaces 32 in this embodiment is formed by a curved surface convex toward the inner side in the tyre width direction of the circumferential groove 30. With the groove wall protruding portions 31 configured as such, it is possible that the snow is condensed along the curved surfaces of the second groove wall surfaces 32, therefore, it is possible that the snow shearing force is improved.

While detailed description has been made of the tyre as an especially preferred embodiment of the present invention, the present invention can be embodied in various forms without being limited to the illustrated embodiments.

WORKING EXAMPLES (EXAMPLES)

Tyres as Examples provided with the circumferential groove(s) having the groove bottom protruding portions and the groove wall protruding portions shown in FIG. 1, tyres as Conventional Example provided with the circumferential groove(s) not having the groove bottom protruding portions and the groove wall protruding portions, and tyres as References provided with the circumferential groove(s) having only the groove wall protruding portions were made by way of test. These test tyres (unused) were tested for driving performance and braking performance during running on a snowy road surface and the test tyres worn up to 50% of the wear limit were tested for the driving performance and the braking performance during running on a snowy road surface. Regarding the References and the Examples, Reference 1 and Example 1 were tested such that they were rotated in a direction in which the opening sides of the groove bottom protruding portions and the groove wall protruding portions were the heel side, and Reference 2 and Example 2 were tested such that they were rotated in the opposite direction. Common specifications of each of the test tyres and the test methods were as follows.

Tyre size: 255/50R20
Tyre rim size: 20×8.03

<Driving Performance and Driving Performance when Worn>

The drive power on a snowy road surface of each of the test tyres was measured by using a testing machine. The results are indicated by an index each based on the Conventional Example being 100, wherein the larger the numerical value, the better the driving performance is.

<Braking Performance and Braking Performance when Worn>

The braking performance on a snowy road surface of each of the test tyres was measured by using a testing machine. The results are indicated by an index each based on the conventional Example being 100, wherein the larger the numerical value, the better the braking performance is.

The test results are shown in Table 1.

TABLE 1

| | Conventional Example | Reference 1 | Reference 2 | Example 1 | Example 2 |
|---|---|---|---|---|---|
| Driving performance [index] | 100 | 112 | 105 | 128 | 122 |
| Braking performance [index] | 100 | 113 | 107 | 125 | 118 |
| Driving performance when worn [index] | 100 | 106 | 102 | 120 | 114 |
| Braking performance when worn [index] | 100 | 107 | 104 | 115 | 111 |

From the test results, as compared with the Conventional Example and the References, it was confirmed that the tyres as the Examples were excellent in the driving performance and the braking performance during running on a snowy road surface and that they maintained good on-snow performance even when the tyres were worn.

The invention claimed is:

1. A tyre comprising a tread portion including a tread surface which is to be in contact with a ground during running, wherein
the tread portion is provided with a circumferential groove extending continuously in a tyre circumferential direction,
the circumferential groove has a groove bottom and a pair of groove walls extending from the groove bottom to the tread surface in a tyre radial direction,
the groove bottom is formed symmetrically with respect to a center line of the circumferential groove in a plan view of the tread portion and includes a plurality of groove bottom protruding portions protruding outwardly in the tyre radial direction from a groove bottom reference surface defined as a surface parallel to the tread surface at a deepest position of a groove depth of the circumferential groove,
each of the groove bottom protruding portions consists of one first groove bottom surface extending in the tyre radial direction and one second groove bottom surface having an angle larger than that of the first groove bottom surface with respect to the tyre radial direction and inclined with respect to the groove bottom reference surface,
each of the groove walls includes a plurality of groove wall protruding portions each protruding toward an inner side of the circumferential groove from a groove wall reference surface defined as a surface along the tyre circumferential direction at a widest position of a groove width of the circumferential groove,
each of the groove wall protruding portions consists of one first groove wall surface extending in a tyre width direction and one second groove wall surface having an angle with respect to the tyre width direction larger than that of the first groove wall surface,
each of the groove bottom protruding portions is formed over an entire width in the tyre width direction of the circumferential groove,
each of the groove bottom protruding portions has a ridge where the first groove bottom surface and the second groove bottom surface meet,
each of the groove wall protruding portions has a ridge where the first groove wall surface and the second groove wall surface meet, and
each of the ridges of the groove bottom protruding portions is arranged at a different position in the tyre circumferential direction from any of the ridges of the groove wall protruding portions.

2. The tyre according to claim 1, wherein
the first groove bottom surface is formed by a flat surface extending in the tyre width direction.

3. The tyre according to claim 1, wherein
a height in the tyre radial direction of the first groove bottom surface is not less than 0.5 mm.

4. The tyre according to claim 1, wherein
the pair of the groove walls is formed symmetrically with respect to the center line of the circumferential groove in the plan view of the tread portion.

5. The tyre according to claim 1, wherein
the second groove wall surface is formed by a curved surface.

6. The tyre according to claim 1, wherein
the second groove wall surface is formed by a flat surface.

7. The tyre according to claim 1, wherein
an interval between the first groove bottom surfaces adjacent to each other in the tyre circumferential direction is in a range of from 10 to 15 mm.

8. The tyre according to claim 1, wherein
an interval between the first groove wall surfaces adjacent to each other in the tyre circumferential direction is equal to the interval between the first groove bottom surfaces adjacent to each other in the tyre circumferential direction.

9. The tyre according to claim 1, wherein
an angle (θ1) of the second groove bottom surface is 70 degrees or more and 87 degrees or less with respect to the tyre radial direction, and
an angle (θ2) of the second groove wall surface is 3 degrees or more and 20 degrees or less with respect to the tyre circumferential direction in the plan view of the tread portion.

10. The tyre according to claim 1, wherein
in a pair of the groove bottom protruding portions adjacent immediately to each other in the tyre circumferential direction, the first groove bottom surface of one of the groove bottom protruding portions is directly connected with the second groove bottom surface of the other groove bottom protruding portion, and
in a pair of the groove wall protruding portions adjacent immediately to each other in the tyre circumferential direction, the first groove wall surface of one of the groove wall protruding portions is directly connected with the second groove wall surface of the other groove wall protruding portion.

11. The tyre according to claim 1, wherein a length (W1) in the tyre width direction of each of the first groove wall surfaces is 1 mm or more.

12. The tyre according to claim 2, wherein the second groove bottom surface is formed by a flat surface.

13. The tyre according to claim 5, wherein the second groove wall surface is formed by the curved surface concave toward the outer side in the tyre width direction of the circumferential groove.

14. The tyre according to claim 5, wherein the second groove wall surface is formed by the curved surface convex toward the inner side in the tyre width direction of the circumferential groove.

15. The tyre according to claim 11, wherein the length (W1) in the tyre width direction of each of the first groove wall surfaces is 20% or less of an interval (P2) between the first groove wall surfaces adjacent to each other in the tyre circumferential direction.

16. The tyre according to claim 15, wherein the length (W1) in the tyre width direction of each of the first groove wall surfaces is 20% or less of the length (Lw) in the tyre circumferential direction of each of the groove wall protruding portions.

17. A tyre comprising a tread portion including a tread surface which is to be in contact with a ground during running, wherein
the tread portion is provided with a circumferential groove extending continuously in a tyre circumferential direction,
the circumferential groove has a groove bottom and a pair of groove walls extending from the groove bottom to the tread surface in a tyre radial direction,
the groove bottom is formed symmetrically with respect to a center line of the circumferential groove in a plan view of the tread portion and includes a plurality of groove bottom protruding portions protruding outwardly in the tyre radial direction from a groove bottom reference surface defined as a surface parallel to the tread surface at a deepest position of a groove depth of the circumferential groove,
each of the groove bottom protruding portions consists of one first groove bottom surface extending in the tyre radial direction and one second groove bottom surface having an angle larger than that of the first groove bottom surface with respect to the tyre radial direction and inclined with respect to the groove bottom reference surface,
each of the groove walls includes a plurality of groove wall protruding portions each protruding toward an inner side of the circumferential groove from a groove wall reference surface defined as a surface along the tyre circumferential direction at a widest position of a groove width of the circumferential groove,
each of the groove wall protruding portions consists of one first groove wall surface extending in a tyre width direction and one second groove wall surface having an angle with respect to the tyre width direction larger than that of the first groove wall surface and inclined with respect to the groove wall reference surface,
each of the groove bottom protruding portions is formed over an entire width in the tyre width direction of the circumferential groove.

18. The tyre according to claim 17, wherein
the second groove wall surface is inclined such that a protruding height thereof from the groove bottom reference surface increases as it goes from one side to the other side in the tyre circumferential direction, and
the second groove wall surface is inclined such that a protruding amount from the groove wall reference surface decreases as it goes from the one side to the other side in the tyre circumferential direction.

* * * * *